Figure 1:
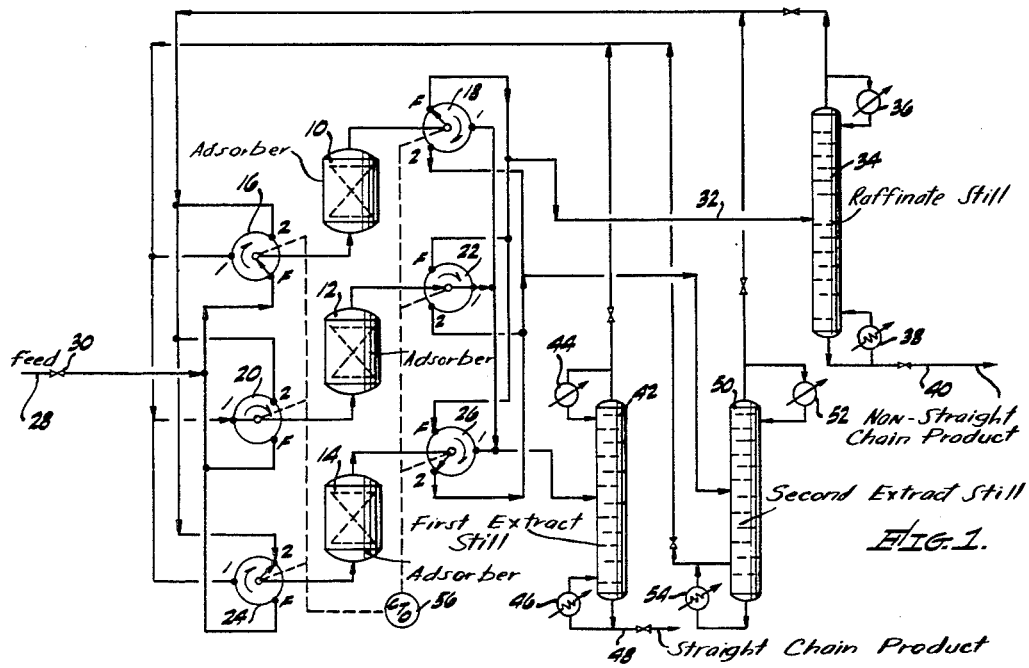

INVENTORS.
RAYMOND N. FLECK,
CARLYLE G. WIGHT,

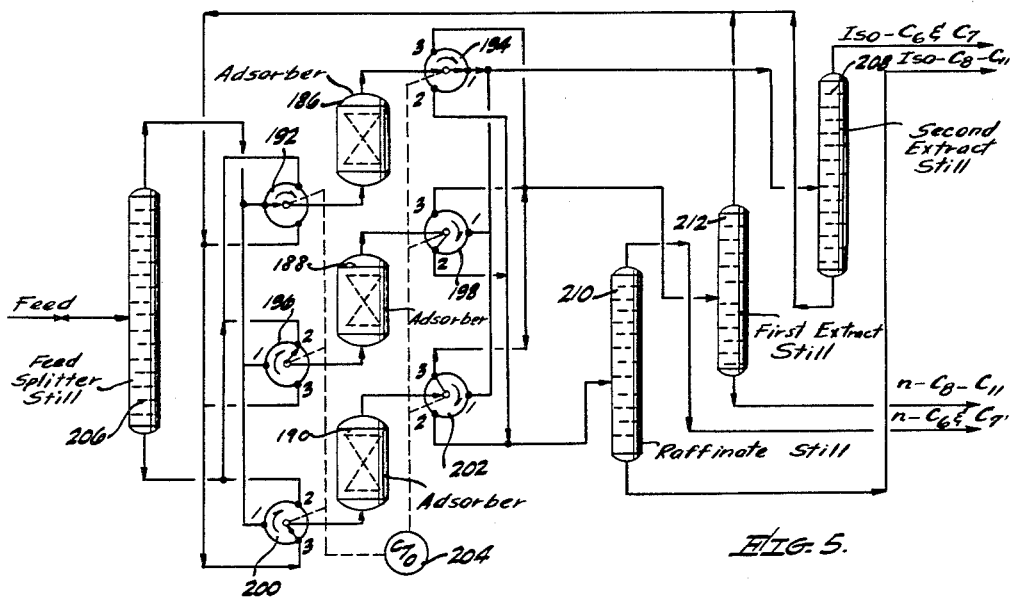
FIG. 5.
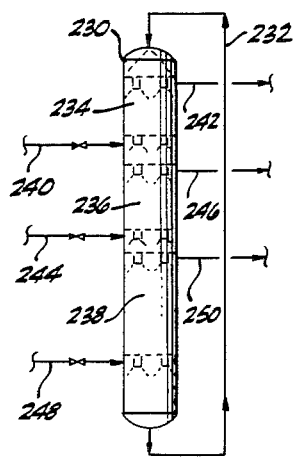
FIG. 7.
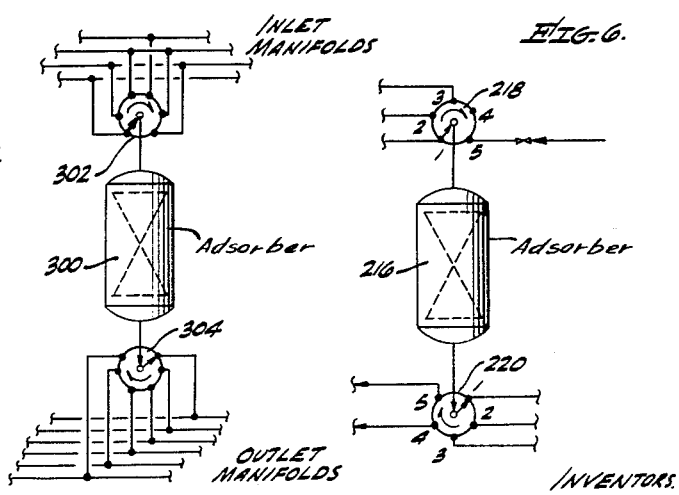
FIG. 9.
FIG. 6.
INVENTORS.
RAYMOND N. FLECK,
CARYLE G. WIGHT,
BY
ATTORNEY.

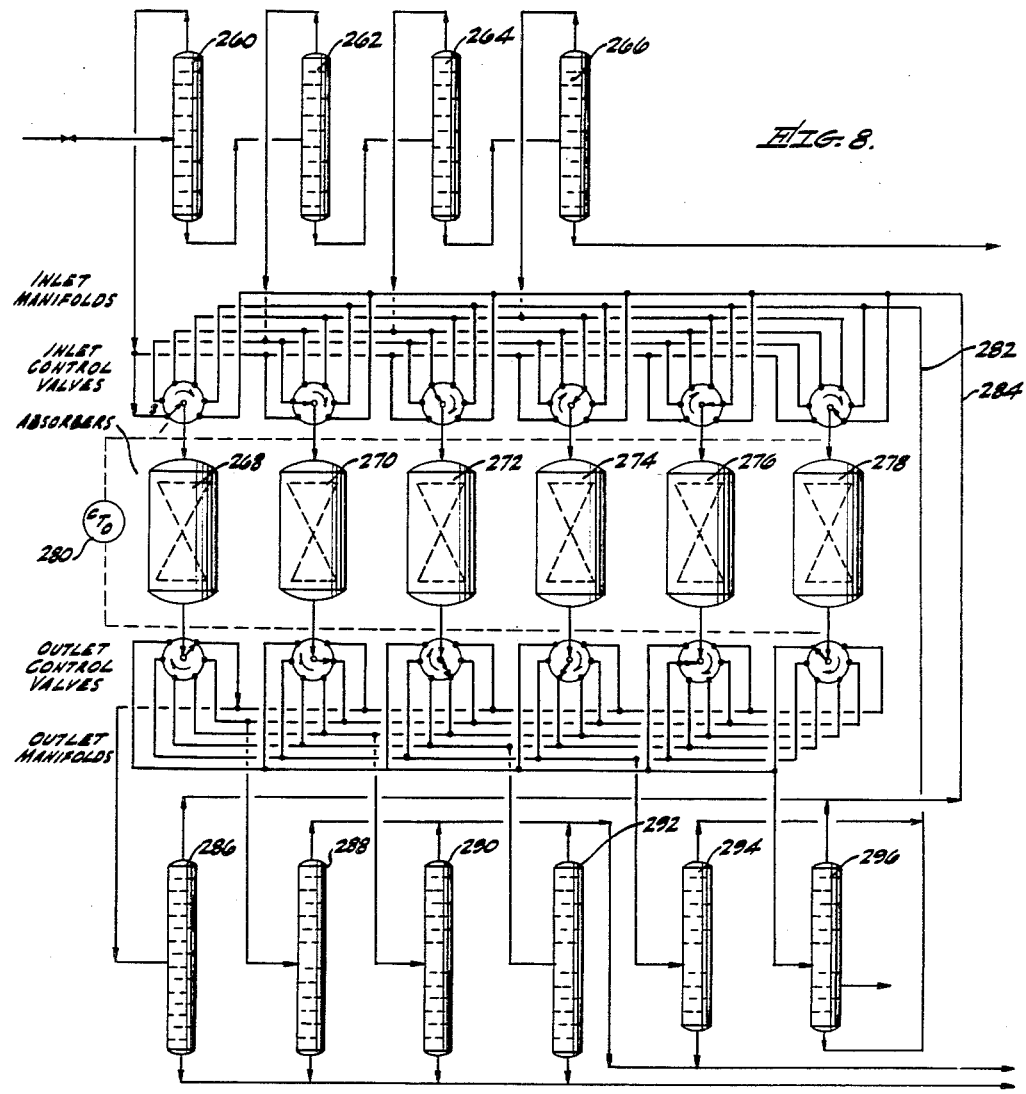

United States Patent Office 2,938,864
Patented May 31, 1960

2,938,864
FRACTIONATION PROCESS USING ZEOLITIC MOLECULAR SIEVES

Raymond N. Fleck, Whittier, and Carlyle G. Wight, Fullerton, Calif., assignors to Union Oil Company of California, Los Angeles, Calif., a corporation of California Filed Sept. 28, 1956, Ser. No. 612,647

13 Claims. (Cl. 208—310)

This invention relates to the fractionation of gaseous or liquid mixtures of hydrocarbons. The invention relates particularly to an improved process for the fractionation of complex hydrocarbon mixtures in the gasoline boiling range to produce a high anti-knock rating gasoline through the selective removal of low anti-knock rating components.

The present invention is directed to an improved process for increasing the anti-knock rating of straight run or cracked gasolines without high temperature treatment, and which is also applicable to the improvement of fairly high anti-knock rating gasolines such as those produced in high temperature or thermal or catalytic treatments. Specifically, the process comprises the separation of low anti-knock components from these materials so as to leave only the high anti-knock rating materials. The process involves the selective adsorption of straight chain normal paraffins or normal olefins from the mixture of hydrocarbons on the basis of their molecular shape. The process however does not require the usual high temperature desorption of the rich adsorbent which is conventionally used in all other adsorptive fractionation processes. Thus the adsorbent saturated with low anti-knock rating components need not be heated or stripped with a stripping gas or both to render it reusable in the process, but rather is subjected to a novel and simple treatment in which an active exchange or displacement of the low anti-knock rate materials is effected by means of a displacement exchange medium which comprises hydrocarbons which may be recycled in the process. The process produces an unadsorbed or raffinate stream of gasoline containing a component displaced from the adsorbent after having been adsorbed thereon during the previous contact step. The displacement exchange materials are of selected boiling range so that they can be separated from the unadsorbed materials by ordinary distillation. The displaced component is a straight chain material of low anti-knock rating. The selective adsorbent is neither heated nor contacted with a foreign stripping gas, but is contacted in sequence with one or more streams of feedstock and one or more hydrocarbon recycle streams thereby eliminating the usual high temperature desorption treatment entirely. If desired, a periodic adsorbent regeneration step may be performed in addition.

It is therefore a primary object of this invention to provide an improved adsorptive fractionation process for treating complex hydrocarbon mixtures, which process eliminates the usual high temperature treatment of the rich adsorbent with a foreign stripping gas such as steam to effect recovery of the adsorbed constituents.

It is a further object of this invention to provide for the fractionation of complex hydrocarbon mixtures to segregate them into relatively pure fractions of various hydrocarbon components of similar physical shape.

It is a more specific object of the present invention to provide for the fractionation of hydrocarbons of relatively wide boiling ranges, such as gasoline, to produce a high anti-knock rating fraction consisting of branched chain saturated and unsaturated hydrocarbons, aromatic and naphthene hydrocarbons, and a relatively low anti-knock rating fraction consisting essentially of straight chain paraffin hydrocarbons.

A more specific object is to provide an improved system for treating wide boiling range hydrocarbon mixtures in which the feed material is initially fractionated into a plurality of more than two feed fractions which are contacted with an adsorbent in sequence of increasing degree of adsorbability, to produce a series of adsorption effluent fractions which are then distilled to separate the unadsorbed constituents, and then treating the adsorbent to remove the heaviest adsorbed materials preparatory to treating again the lower molecular weight fractions of the feed material.

It is also an object of the present invention to provide an improved procedure for displacing adsorbed relatively high molecular weight materials from the adsorbent, such as in the process defined by the object immediately above, in which a plurality of displacement exchange materials is used to contact the rich adsorbent in sequence of decreasing adsorbability in order to restore its adsorption capacity for relatively low molecular weight materials.

It is a specific object of this invention to provide an improved fractionation process for complex hydrocarbon mixtures of wide boiling range in which the feed stream is divided into a series of relatively narrow range materials, the adsorbent is contacted with these relatively narrow range materials in a sequence of individual steps in increasing average boiling point, after which the rich adsorbent is contacted with a series of displacement exchange streams in a sequence which involves a decreasing molecular weight or average boiling point.

Other objects and advantages of the present invention will become apparent to those skilled in the art as the description and illustration thereof proceed.

The process of the invention is based on our discovery that, with the particular adsorbents described below, the efficiency of the displacement exchange of an adsorbed material on the adsorbent for an adsorbable material in a stream which subsequently contacts the adsorbent in the vapor phase is relatively high when the adsorbed material has a lower molecular weight than that of the adsorbable material contacting the adsorbent. For example, in the vapor phase treatment of a typical gasoline fraction, a displacement exchange efficiency of 99.5% is readily obtainable when contacting an adsorbent containing adsorbed normal hexane with a vapor stream containing normal heptane. In other words, one volume of normal hexane is very readily displaced from a rich adsorbent in exchange with one equilibrium volume of more readily adsorbable normal heptane, and the exchange is substantially complete. The reverse procedure however is only about 75% efficient under the same conditions due to the preferential adsorption in the vapor phase of the relatively high molecular weight hydrocarbons. For example, when the adsorbent contains adsorbed normal decane the effective desorption thereof with normal butane is of relatively low efficiency, and will require approximately 80 equilibrium volumes of normal butane to desorb one volume of normal decane.

In the liquid phase contacting of hydrocarbons with the present adsorbents, these displacement efficiencies are reversed, that is, the lower molecular weight liquid substantially completely displaces the higher molecular weight liquid. However, liquid holdup of the adsorbent is sometimes deleteriously high.

It has further been found that the displacement exchange of relatively high molecular weight adsorbed materials by and for relatively low molecular weight adsorbable materials can be remarkably facilitated by effecting the displacement exchange with a plurality of streams contacting the rich adsorbent in a sequence of progressively lower molecular weights or average boiling points. For example, it has been found in the complete displacement exchange of normal decane, the 80 volumes of displacement exchange material required when using normal butane for this material can be reduced to almost one-third that amount by first contacting the adsorbent containing the normal decane with about 14 volumes of normal heptane, and then contacting this adsorbent containing the normal heptane with about 14 more volumes of a displacement exchange material containing normal butane. The activity restoration is very close to the same as that obtained when 80 volumes of normal butane alone are used. Further improvement is noted in using a greater number of steps in the sequence.

Thus, in the process of the present invention, the removal of relatively high molecular weight materials adsorbed on the adsorbent is effected by conducting the displacement exchange in a plurality of stages or a sequence of steps in employing a series of displacement exchange materials of successively decreased molecular weight or of average boiling point.

The plural stage displacement exchange steps of the process outlined above can be either relatively pure recycle streams separated from the adsorption effluents or raffinates and recirculated in the process, or in some specific cases they may be selected fractions of the feed stock.

For example, a wide range reformed gasoline stream may be distilled to produce a $C_5$ fraction, that is, one containing substantially all of the constituents containing five carbon atoms, $C_6$ fraction, a $C_7$ fraction, a $C_8$ fraction, and a $C_9+$ fraction. The adsorbent is then contacted successively with these individual feed fractions in a series of steps involving separate contacts with the fractions in order of increasing molecular weight. After the last contact the adsorbent is saturated with the more readily adsorbable materials from the $C_9$ fraction. As indicated previously, these materials are not very efficiently displaced by and exchanged for the more readily adsorbable materials in the $C_6$ fraction. However, these adsorbed materials are readily removed from the adsorbent by contacting the rich adsorbent with a plurality of displacement exchange streams in sequence of decreasing adsorbability. The $C_9$-saturated adsorbent, for example, is contacted first with a relatively small stream of recycled more readily adsorbable $C_7$ components and then with a relatively small stream of recycled more readily adsorbable $C_5$ hydrocarbons. Then the adsorbent is contacted again with the first or $C_6$ feed stream and the cycle is repeated.

In another modification of the process of the invention, the adsorbent saturated with adsorbable $C_9$ components is treated for displacement exchange with the $C_8$ feed stream, followed by the $C_7$ stream, then followed by the $C_6$ stream again to begin a new cycle. Following this, the higher molecular weight feed streams are contacted in order of increasing molecular weight, and the cycle is continued. Although the treatment according to this last modification produces a series of seven effluents of different composition, the need for producing recycle streams containing pure components or components in high concentration is eliminated.

Although it is desired to avoid high temperature stripping of rich adsorbent with foreign stripping gases, it is within the contemplation of this invention to include in the adsorbent restoration part of the cycle other treatments which may facilitate the displacement exchange. This includes a brief period of pressure reduction on the adsorbent such as a vacuum treatment, contacting the adsorbent with a non-adsorbable material such as one of the pure or relatively pure recycle components mentioned above, or the like.

Although the plural stage displacement exchange treatment of rich adsorbents is very effective in the treatment of adsorbents which in turn are employed to fractionate wide range feed materials in plural stages, this system of adsorbent desorption is also obviously very effective in removing even a single high molecular weight material from an adsorbent. For example, in the purification of a mixture of $C_{10}$ hydrocarbons, the removal of the adsorbed $C_{10}$ constituents is most readily effected by plural stage displacement exchange even though the adsorbed materials did not accumulate on the adsorbent in a process in which it was treated with a plurality of feed streams. It should thus be understood that plural stage displacement exchange is not limited to use with adsorptive fractionation processes involving a plurality of feed streams, but is applicable to high efficiency in any situation where a high molecular weight material is to be removed from an adsorbent.

Furthermore, it should be understood that in the treatment of wide boiling range feed streams other methods for removal of the heaviest adsorbed material may be applicable. For example, a vacuum treatment, alone or coupled with a contact with one recycle stream of relatively non-adsorbed material such as benzene, may be effective in the removal of the highest molecular weight adsorbed material. Thus the plural stage displacement exchange is not necessarily used, although it is a preferred procedure of very high efficiency in such cases. In some instances of relatively low molecular weight materials, for example, three feed stream fractions containing 4, 5, and 6 carbon atom molecules, respectively, a single displacement exchange contact is frequently sufficient.

The adsorbent employed in the process of this invention is a solid granular material having a mesh size range between about 2 and 100 mesh and preferably between about 4 and about 30 mesh. It is used in the form of a dense compact bed of material through which the feed and displacement and exchange recycle streams pass, either in the vapor phase or in the liquid phase. The process may employ the adsorbent in the form of a single static bed of material in which case the process is only semi-continuous. Preferably a plurality of two or more static beds of adsorbent are employed with appropriate remotely operable valving so that the feed stream is passed through one or more of the adsorbers in a set while the exchange displacement stream passes through one or more of the other adsorbers in the set. In this case the feed and product flows are continuous. When the granular adsorbent is sufficiently rugged physically the moving solids bed modification may be employed in which flow of feed is maintained continuously through an adsorption zone and flow of displacement exchange fluid is maintained continuously through a desorption zone, and the granular adsorbent is recirculated successively through these two zones. With the smaller sized mesh ranges of adsorbent, the material may be fluidized in and by the fluid streams contacting it, although the compact bed modifications are preferred since a greater number of theoretical and actual contact stages are more readily obtained in smaller and simpler equipment.

The adsorbents employed in the practice of the present invention are the natural or synthetic crystalline zeolitic partially dehydrated metallo alumino silicates having substantially uniform intracrystalline pores about 5 A. in diameter. The composition of a typical synthetic zeolite having a pore size of about 4 A. is $$[Na_2O \cdot Al_2O_3 \cdot (SiO_2)_2]$$

It may be prepared by heating stoichiometric quantities of alumina and silica and excess caustic under pressure. Part of the sodium in this material can be ion exchanged with concentrated calcium salt solutions at superatmospheric pressure and temperatures of 150–300° C. to introduce calcium to produce $[CaO \cdot Al_2O_3 \cdot (SiO_2)_2]_{0.7}$ 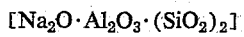 $[Na_2O \cdot Al_2O_3 \cdot (SiO_2)_2]_{0.3}$ having a pore size of about 5 A. Certain naturally occurring materials such as chabazite, analcite, gmelinite, and the like can be heated to effect a partial dehydration and obtain an activated zeolitic adsorbent similar in adsorption properties to the manufactured zeolites. These natural and synthetic materials are all zeolites and their sodium and calcium derivatives are very stable adsorbents which apparently have "pores" available for adsorption which are quite uniform in size. Other derivatives have different sized "pores." The molecules which are the more readily adsorbable and for which the adsorbent exerts preferential adsorptive forces are those having straight chain molecules whose minimum dimensions are equal to or slightly less than these pore dimensions. Thus the normal paraffins and normal olefins with cross chain dimensions of under 5 A. are very strongly and very readily adsorbed by these materials. However the branched chain paraffins or olefins, and the napthene and aromatic hydrocarbons, all having molecular dimensions in the shortest direction in excess of 5 A. are substantially non-adsorbable. These adsorbents are thus selective for normal paraffins and normal olefins if present, and will not adsorb any appreciable quantity of other hydrocarbons.

The adsorbents of the present class tend to adsorb polar materials to varying degrees. In gasoline treating this interferes with the fractionation of gasoline hydrocarbons as a function of molecular shape. Accordingly, it is contemplated in this invention to first contact the feed stream with a material which exhibits very strong adsorptive forces for these polar materials and thereby remove them from the stream to be treated. This pre-adsorption or pre-treating of the feed may be accomplished by contacting the feed stream with an inorganic halide such as copper chloride, calcium chloride, magnesium chloride and the like. One preferred form of this pretreatment is to contact the feed with the partially dehydrated metallo alumino silicate designated as molecular sieve 13X. In this way high polar materials such as ethers, thio-ethers, water, alcohols, mercaptans and amines are readily removed from the feed.

Although the pre-adsorption step prevents rapid deactivation of the main adsorbent beds, some deactivation may eventually occur. It is within the contemplation of this invention to regenerate the adsorbent occasionally when required. This may be accomplished by high temperature steam stripping, liquid extraction, oxidative regeneration as in solid catalyst regeneration, etc., or combinations of such methods as may be required by the particular adsorbent.

Figure 2:
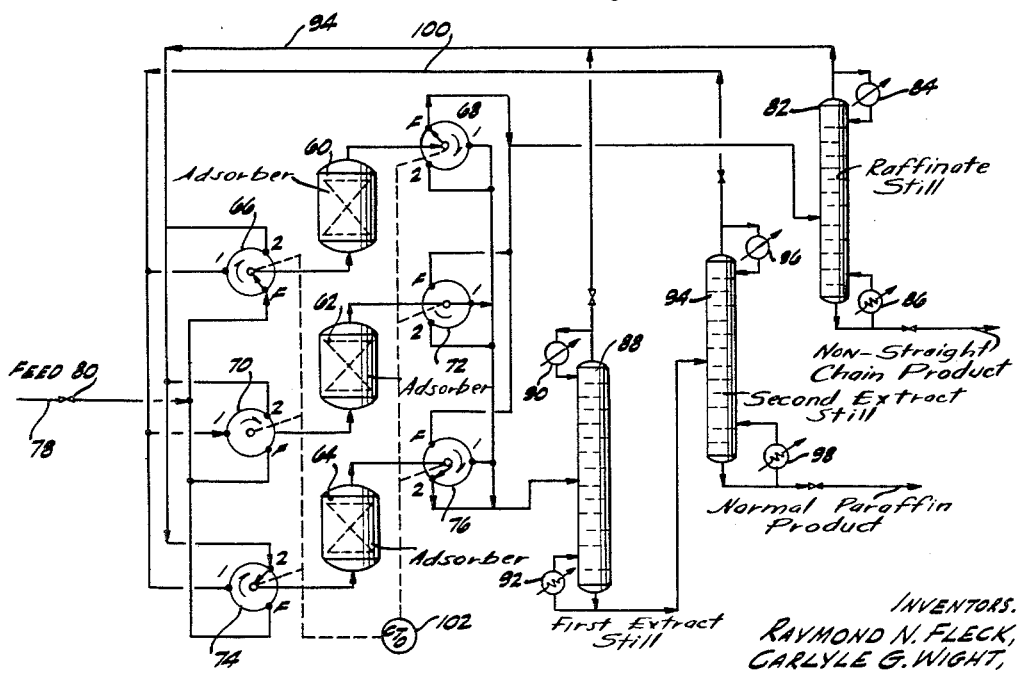
Figure 3:
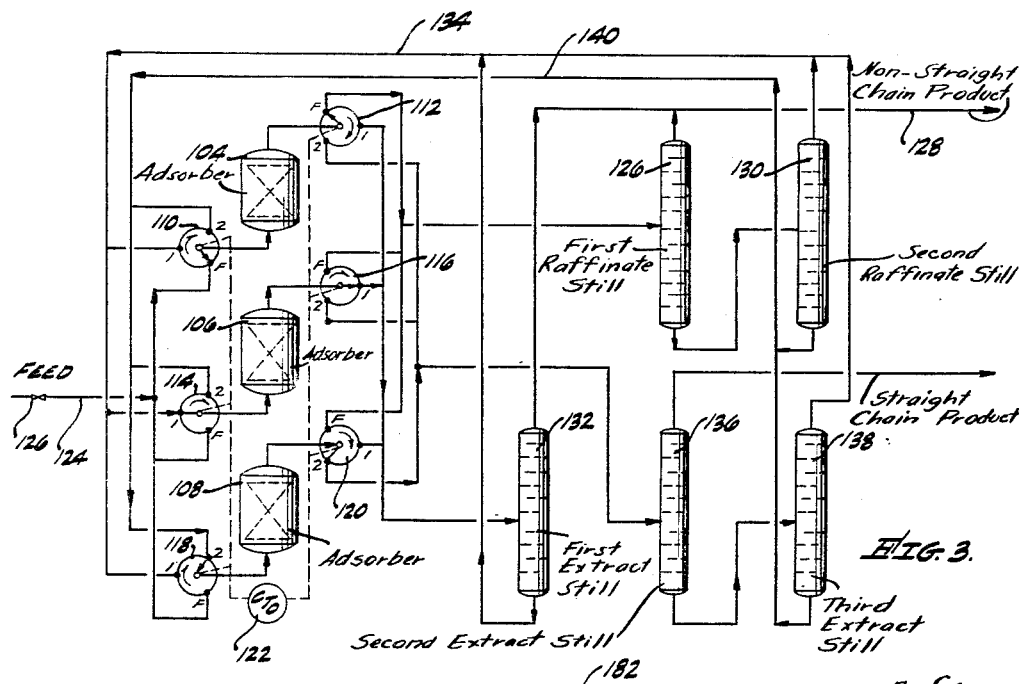
Figure 4:
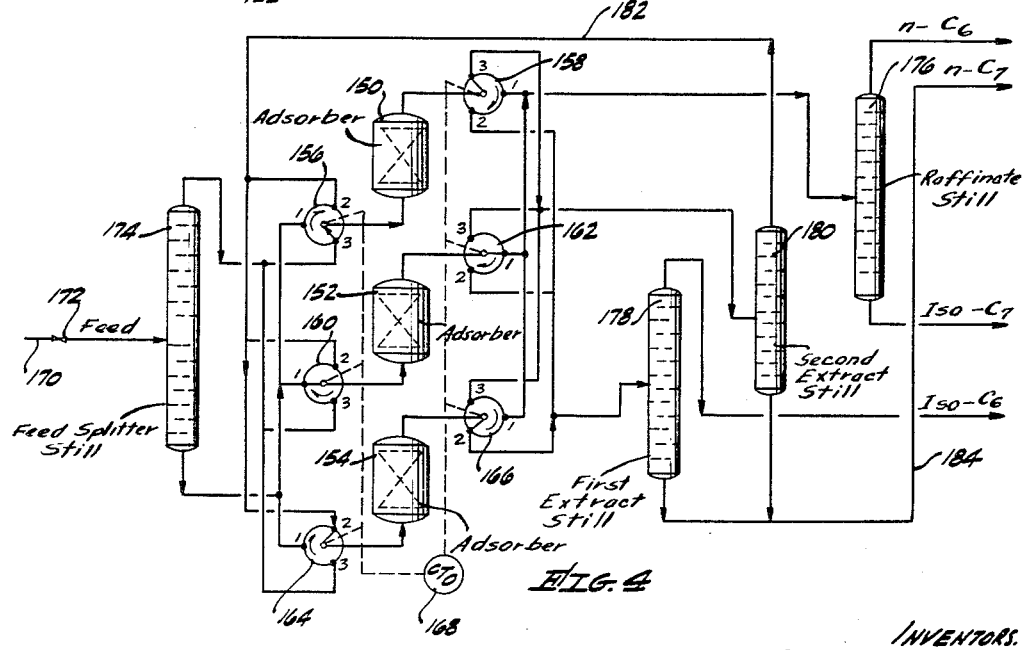

The process of the invention and the modifications thereof will be more readily understood by reference to the accompanying drawings in which:

Figures 1, 2, and 3 are schematic flow diagrams of three modifications of the process of this invention in which several recirculated streams separated from the adsorption effluents are employed in sequence to remove from the rich adsorbent the adsorbed feed materials by a series of displacement exchange treatments, Figures 4 and 5 are schematic flow diagrams of modifications of the process of this invention in which at least one of the plural displacement exchange streams used to contact the rich adsorbent is produced from the feed stream by distilling the feed into two fractions, Figure 6 is a fragmentary process flow diagram showing the manner of modification of the inlet and outlet flow control valves used in the processes of Figures 1 through 5 to permit in the cycle other desorption treatments in addition to those referred to above, Figure 7 shows a simplified schematic flow diagram of the process modifications of Figures 1 through 5 so as to employ a recirculating adsorbent, Figure 8 is a full schematic flow diagram of the process of this invention employing plural feed streams and plural stage displacement exchange using recycle streams separated from the adsorption effluents to separate a wide boiling range complex mixture, and Figure 9 is a fragmentary process flow diagram indicating the modification of the inlet and outlet flow control valves and manifold system to be used in the process of Figure 8 so as to contact the adsorbent only with a sequence of feed fractions, the molecular weight or average boiling point of which first rises in successive stages and then falls, and in which the exchange displacement streams used are not recirculated.

In the description of the drawings which follows, the flow of the individual streams of feed and of displacement exchange material is shown passing through each adsorber in the same direction. This is an effective procedure and is probably the simplest to illustrate. The efficiency of displacement exchange is somewhat greater if the flow direction is reversed each time a displacement exchange stream, containing less readily adsorbable constituents, contacts the adsorbent. For example, in a vertical adsorber, the $C_6$, the $C_7$, the $C_8$, and the $C_9$ streams are passed in order down through the adsorber and then the $C_7$ and the $C_5$ displacement exchange streams are passed up through it to return to the beginning of the cycle. In other words, displacement exchange streams flow in a direction which is opposite to that of the feed fractions.

In the drawings, the changes which are required to reverse the flow direction of the displacement exchange stream simply involve reversing the connections leading into and from the corresponding manifolded valve ports on the inlet and outlet control valves. Valve sequence remains the same, only the flow direction changes. Such a modification can readily be made by those skilled in the art in view of the above disclosure.

Referring now more particularly to Figure 1, the apparatus consists essentially of adsorbers 10, 12, and 14 each provided respectively with inlet and outlet control valves 16 and 18, 20 and 22, and 24 and 26, respectively. The adsorbent present is the metallo alumino silicate referred to above having 5 A. pores. The feed stream, consisting of an impure mixture of normal and iso-decanes, is introduced through line 28 at a rate controlled by valve 30 and is passed in the path shown through adsorber 10 in which the normal decane is adsorbed, the branched chain decanes remain unadsorbed, and the normal butane previously saturating the adsorbent is displaced by and exchanged with the normal decane being adsorbed. The adsorption effluent, or raffinate, containing iso-decane and normal butane passes through outlet control valve 18 through line 32 into still 34. This still is provided with overhead condenser 36 and bottoms reboiler 38. The normal butane is readily distilled overhead from the iso-decane which is produced as a bottoms product through line 40 substantially free of normal decane. The normal butane is recycled as the second recycled displacement exchange stream hereinafter described.

Simultaneously with this adsorption in first adsorber 10, which produces an adsorbent saturated with normal decane, a first displacement exchange stream containing normal heptane is contacting the adsorbent in second adsorber 12. The displacement exchange taking place consists in the adsorption of normal heptane and the displacement thereby of normal decane. The first displacement exchange effluent, or first extract, passes into still 42 provided with overhead condenser 44 and bottoms reboiler 46 in the manner shown on the drawing and the normal heptane is distidlled overhead leaving normal decane substantially free of iso-decane as a bottoms product removed from the system through line 48. This first displacement exchange treatment of adsorbent in second adsorber 12 forms a partially regenerated adsorbent saturated with normal heptane but containing substantially no normal decane.

The third step in this cyclic process simultaneously occurs in third adsorber 14 in which the normal heptane saturated adsorbent is contacted with the second displacement exchange stream comprising normal butane. In this exchange normal butane is adsorbed thereby displacing the normal heptane. The second displacement exchange effluent, or second extract, flows from third adsorber 14 in the manner shown on the drawing into second extract still 50 provided with overhead condenser 52 and bottoms reboiler 54. The overhead product is normal butane vapor which is joined with the overhead vapor from raffinate still 34 to form the second displacement exchange recycle stream. From the bottom of second extract still 50 is removed normal heptane vapor which is joined with the overhead from first extract still 42 to form the first displacement exchange recycle stream consisting of normal heptane.

A cycle timer operator 56 provides a simultaneous actuation of inlet and outlet control valves so that the adsorbent in each of the three adsorbers 10, 12, and 14 is contacted, in a staggered sequence, successively with first the feed stream, second the first displacement exchange stream comprising normal heptane, and third the second recycle displacement exchange stream comprising normal butane.

By displacing adsorbed normal decane in two stages in the manner described it has been found that 14 volumes of normal heptane followed by 14 volumes of normal butane in the two displacement exchange treatments accomplish substantially complete recovery of normal decane from the adsorbent, whereas about 80 volumes of normal butane alone would be required to accomplish this same thing.

In order to demonstrate quantitatively the operation of the process described above in connection with Figure 1, the adsorbent was saturated with normal decane in a previous adsorption step. The rich adsorbent was then contacted according to the principles of this invention in a two-stage displacement exchange treatment using normal octane as the first displacement exchange stream followed by normal hexane as the second stream. In a comparison experiment the same normal decane saturated adsorbent was contacted with normal hexane only as the displacement exchange stream. In both cases the displacement exchange streams were passed over the rich adsorbent in successive volumes each equal to the volume of normal decane originally present on the rich adsorbent. The series of displacement exchange effluents thus produced were analyzed to determine the successive amounts of normal decane removed from the adsorbent by the displacement exchange action of each of the incremental volumes of displacement exchange fluid. The results were calculated and expressed as volume percent of the amount of normal decane originally present on the rich adsorbent. The displacement exchange treatment was conducted with the displacement exchange fluids in the vapor phase at a temperature of 403° F. and at substantially atmospheric pressure. The results of this comparison of one-stage displacement exchange and the two-stage displacement exchange treatment according to this invention are expressed in the following table.

TABLE I

*Comparison of effectiveness of two-stage and one-stage displacement exchange*

| Volumes of Displacement Exchange Fluid a | One-Stage | | | Two-Stage | | |
|---|---|---|---|---|---|---|
| | Fluid | Percent n-Decane b Displaced Per Pass | Cumulative Percent n-Decane Recovered | Fluid | Percent n-Decane b Displaced Per Pass | Cumulative Percent n-Decane Recovered |
| 1.0 | n-C$_6$ | 49.5 | 49.5 | n-C$_8$ | 68.0 | 68.0 |
| 1.0 | n-C$_6$ | 14.3 | 63.8 | n-C$_8$ | 21.1 | 89.1 |
| 1.0 | n-C$_6$ | 9.5 | 73.3 | n-C$_6$ | 7.1 | 96.2 |
| 1.0 | n-C$_6$ | 6.2 | 79.5 | n-C$_6$ | 2.2 | 98.4 | a Based on volume of n-decane originally adsorbed on the rich adsorbent.
b Percent of n-decane originally on the rich adsorbent.

On comparison of the cumulative percent of the normal decane removed, appearing in the fourth and seventh columns of Table I, it is seen that the two-stage displacement exchange is uniformly more efficient than is the one-stage displacement exchange. It is also apparent that two volumes of normal octane followed by two volumes of normal hexane readily effect a substantially complete removal of the normal decane, in distinction to the inability of four volumes of normal hexane alone to effect such an efficient recovery with the same quantity of displacement exchange fluid. In order for normal hexane to effect a 98.4% recovery of normal decane, approximately 20 to 25 volumes of normal hexane must be passed over the rich adsorbent. Further reductions in the quantity of displacement exchange material necessary to achieve a given percent recovery of adsorbed material from an adsorbent are realized by increasing the number of displacement exchange streams. Successively contacting the normal decane saturated adsorbent of the previous examples with normal nonane, normal octane, normal heptane, and normal hexane in sequence will reduce the total quantity of displacement exchange fluid from the four volumes necessary when using normal octane and normal hexane to about 2.5 volumes when using four separate displacement exchange fluids.

To employ displacement exchange streams flowing through the adsorbent in the reverse direction to the feed in the process of Figure 1, four changes are made; (1) the first displacement exchange stream from stills 42 and 50 is connected to the manifolded ports numbered 1 on the outlet valves, (2) the second displacement stream from stills 50 and 34 is connected to the manifolded ports numbered 2 in the outlet valves, (3) manifolded ports numbered 1 on the inlet valves are connected to the feed point of still 42, and (4) manifolded ports numbered 2 on the outlet valves are connected to the feed point on still 52. With these changes, the feed flows up through the adsorbers and the displacement exchange streams flow down through them. Analogous changes are made in the processes of the other figures to reverse the displacement flow.

Referring now more particularly to Figure 2, a somewhat modified process is shown in which a relatively wide range gasoline stream consisting of iso and normal paraffins having from 6 to 9 carbon atoms per molecule in admixture with non-adsorbable aromatic and naphthene hydrocarbons in the same boiling range, is treated for the removal of the normal or straight chain hydrocarbons by adsorption on the metallo alumino silicate adsorbent having pores of 5 A. The two-stage displacement exchange treatment employed uses normal hexane as a first displacement exchange recycle stream and normal pentane as the second displacement exchange recycle stream. In this modification first adsorber 60 is being contacted by the feed stream, second adsorber 62 is being contacted by the first displacement exchange stream, and third adsorber 64 is being treated by the second displacement exchange stream. The inlet and outlet control valves 66 and 68, 70 and 72, and 74 and 76 are provided respectively on the three adsorbers, and are remotely actuated by cycle timer 102.

The feed stream is introduced through line 78 at a rate controlled by valve 80 and passes through inlet valve 66 into adsorber 60. The adsorbent, saturated with the normal pentane second displacement exchange component employed in the fluid stage of the previous cycle of operation, adsorbs the normal hexane, heptane, octane, and nonane present in the feed stream, and displaces thereby the normal pentane. The adsorption effluent flows in the manner shown to raffinate still 82 provided with overhead condenser 84 and bottoms reboiler 86. Still 82 produces as a bottoms product the unadsorbed branched chain paraffins having 6 to 9 carbon atoms and any other constituents which are unadsorbable on the adsorbent. This includes aromatic and naphthenic hydrocarbons in this same boiling range. Produced overhead from still 82 is the normal pentane displaced from the adsorbent during the first step of the process.

The rich adsorbent produced in the first stage of the previous cycle of operation is simultaneously being contacted in second adsorber 62 by a stream of normal hexane used herein as the first displacement exchange stream. An active displacement exchange takes place leaving the adsorbent saturated with normal hexane and producing a first displacement exchange effluent comprising normal hexane and the displaced normal paraffins having from 6 to 9 carbon atoms per molecule. This material passes from adsorber 62 in the manner shown on the drawing into the first extract column 88.

In third adsorption zone 64 the partially regenerated adsorbent, saturated with normal hexane in the second stage of previous cycle of operations, is simultaneously being treated with the second displacement exchange recycle stream comprising normal pentane. This material passes through adsorption zone 64 and is joined with the first displacement exchange effluent flowing from second adsorber 62 in the manner shown on the drawing. The second extract comprises the second displacement exchange component, normal pentane, as well as the normal hexane displaced from the adsorbent. The combined first and second displacement effluents therefore comprise normal pentane and normal hexane components of the displacement exchange streams as well as the displaced normal paraffins having 6 to 9 carbon atoms per molecule. This combined stream is introduced into still 88 provided with overhead condenser 90 and bottoms reboiler 92. The overhead product from this still is the normal pentane which is joined with that from the overhead of raffinate still 82 to produce the second displacement exchange recycle stream which is recycled in manifold 94. The bottoms material comprises the normal paraffins including the first displacement exchange stream of normal hexane. This material is passed as shown on the drawing into second extract still 94 provided with overhead condenser 96 and bottoms reboiler 98. Produced overhead from second extract still 94 is a sufficient quantity of normal hexane to constitute the first displacement exchange recycle stream and this material is recirculated through manifold 100. The bottoms product produced from second still 94 consists of the net product of normal paraffins having 6 to 9 carbon atoms per molecule present in the feed stream.

The bottoms product from second extract still 94, consisting of normal paraffins, comprises a very low anti-knock rating material separated from the feed stream, whereas the bottoms product from raffinate still 82 comprises virtually all of the high anti-knock rating constituents present in the feed.

In the process of Figures 1 and 2, each bed of adsorbent is contacted successively with the feed and then with the first and second displacement exchange streams.

Referring now more particularly to Figure 3, a modification of the process of employing a plurality of displacement exchange recycle streams used in sequence is shown. This modification is specifically adapted to the treatment of adsorbents which exhibit some polar adsorption properties and thus will adsorb some materials such as branched chain olefins and aromatic hydrocarbons as well as the normal paraffins of a given feed stream. With the present adsorbent having 5 A. pores, about 2 to 4% of such polar materials appear to be adsorbed in the adsorbed phase. In the process of Figure 3, three adsorbers 104, 106, and 108 are provided respectively with inlet and outlet control valves 110 and 112, 114 and 116, and 118 and 120. These valves are actuated in sequence by cycle timer operator 122. A feed stream consisting of straight chain and branched chain hexanes and containing benzene as a polar ingredient is introduced through line 124 at a rate controlled by valve 126 and passes through first adsorber 104 wherein it contacts an adsorbent saturated with the second displacement exchange component, in this case normal octane, and also contains a small amount of toluene which is employed as the first displacement exchange material. The first adsorption effluent comprises non-adsorbed benzene and, the branched chain hexanes which remain unadsorbed, as well as the displaced normal octane and toluene displaced from the adsorbent by the normal hexane adsorption. This adsorption effluent is passed in the manner shown into first raffinate still 126, provided with an overhead condenser and a bottoms reboiler not shown. The overhead product consists of unadsorbed iso-hexanes and benzene and these materials are removed through line 128 as a high anti-knock rating product. The bottoms stream from still 126 comprises displaced normal octane and toluene, and this material is introduced into second raffinate still 130 which produces as an overhead a stream of toluene to be used as a first displacement exchange component, and a bottoms stream consisting of normal octane which is used as the second displacement exchange component.

Simultaneously with the feed adsorption in adsorber 104, the second stage of the process is being effected in second adsorber 106. The rich adsorbent, previously contacted by the feed, is being treated by the first displacement exchange stream which comprises toluene. The purpose of the toluene is to displace and exchange the relatively small quantity of adsorbed benzene from the rich adsorbent. The first displacement exchange effluent so produced comprises toluene together with the displaced benzene, and this material flows in the manner shown from adsorber 106 into first extract still 132. The overhead product comprises the displaced benzene which is joined with the high anti-knock rating raffinate produced overhead from first raffinate still 126. The bottoms product from still 132 comprises toluene which is recirculated to manifold 134.

Simultaneously with these two operations in the process, the adsorbent in third adsorber 108 is being contacted by the second displacement exchange stream, in this case normal octane. The second exchange effluent thus produced comprises the normal octane recycle stream together with normal hexane and toluene displaced from the adsorbent. This material flows in the manner shown to second extract still 136 which produces an overhead comprising normal hexane, which is the low anti-knock rating constituent of the feed. The bottoms stream from still 136 comprises toluene and normal octane, and in third extract still 138 these materials are separated to produce toluene as an overhead product which is recirculated through manifold 134 as the first displacement exchange recycle stream. The bottoms product from still 138 comprises normal octane, and this is joined with the normal octane produced as a bottoms product from still 130. This mixture comprises the second displacement exchange stream, and it is recirculated through manifold 140 to treat the adsorbent in the manner described.

In the foregoing example the first and the second displacement exchange streams were selected on the basis of their ability to displace separately certain elements contained in the feed stream. Specifically, toluene is employed as the first recycle stream in order to displace benzene from the rich adsorbent, and normal octane is employed as the second recycle stream to displace the normal hexane from the adsorbent. This is an example of multiple stage displacement exchange applied to the separate removal of specific components from a rich adsorbent, and such a step as the toluene treatment can be included in the other processes described herein.

Referring now to Figure 4, a somewhat modified form of the present process is shown in which a two-stage displacement exchange is effected using one part of the feed stream as a source of the desired displacement exchange component. In the process of Figure 4, a series of three adsorbers 150, 152, and 154 is employed and are provided respectively with inlet and outlet control valves 156 and 158, 160 and 162, and 164 and 166 each remotely operated in sequence by cycle timer operator 168. A feed stream containing iso and normal hexanes and heptanes, and which may contain higher or lower boiling components, is introduced through line 170 at a rate controlled by valve 172 into feed splitter still 174. As previously, the distillation equipment indicated in Figure 4 is provided with overhead condensers, bottoms reboilers, pumps, and valves which are conventional and are therefore not shown. The adsorbent is the metallo alumino silicate with 5 A. pores.

The bottoms product from still 174 comprises the feed stream and consists of iso and normal heptanes and any higher molecular weight hydrocarbons. The first displacement exchange stream primarily comprises iso-hexane produced from the adsorber effluents, and the second displacement exchange stream comprises the overhead product of feed still 174. This stream contains iso and normal hexanes and any lower molecular weight materials.

The bottoms product from feed still 174 passes in the manner shown into and through adsorber 152. The iso-heptane remains unadsorbed, and the adsorption of normal heptane effects a displacement exchange with the normal hexane then saturating the adsorbent. This produces an adsorption effluent consisting of iso-heptanes and the displaced normal hexane. This material flows from adsorber 152 in the direction shown into raffinate still 176. A low anti-knock rating overhead product is produced from this still comprising the normal hexane. A high anti-knock rating product consisting of iso-heptanes, and any higher boiling branched chain hydrocarbons, is produced as a bottoms product from still 176.

Simultaneously with this treatment, another bed of rich adsorbent produced by such feed contact is being treated in adsorber 154 by the first displacement exchange stream comprising iso-hexane and only a trace of normal hexane which is recirculating in the process. In this second stage of adsorbent treatment the iso-hexane in the first displacement exchange stream remains unadsorbed and all of the normal hexane therein is adsorbed in partially displacing and exchanging with the adsorbed normal heptane on the rich adsorbent. This produces a first displacement exchange effluent containing iso-hexane and the displaced normal heptane. This material flows in the manner shown into first extract still 178 in which the iso-hexane as a high anti-knock rating product is separated overhead. The displaced portion of the normal heptane is removed as a bottoms product from first extract still 178.

Simultaneously with these two treatments, the partially regenerated adsorbent produced in the manner described above in connection with adsorber 154, is being treated with the second displacement exchange stream in adsorber 150. The overhead fraction of the feed, which is employed as the second displacement exchange stream and comprises some iso-hexane and a substantial quantity of normal hexane, contacts the partially regenerated adsorbent in adsorber 150. The iso-hexane remains unadsorbed and the normal hexane is adsorbed to a substantial degree in displacing and exchanging with the remaining portion of the adsorbed normal heptane. This produces a second displacement exchange effluent which flows to second extract still 180. The iso-hexane and a trace of normal hexane are produced as an overhead product which is recirculated through manifold 182 as the first displacement exchange stream. The remaining displaced normal heptane is produced as a bottoms product from still 180. This material is combined in line 184 with that normal heptane produced as bottoms product from still 178, and the two together are removed from the process as a low anti-knock rating product.

The difference between the first and the second displacement exchange streams in the above modification lies in the changing concentration of normal hexane. The first stream consists mostly of iso-hexane but contains a relatively minor amount of normal hexane separated from the second displacement exchange effluent. The second displacement exchange stream is the overhead fraction from the feed and contains some iso-hexane but also a substantial quantity of normal hexane.

Referring now to Figure 5, a somewhat modified process from that described above in connection with Figure 4 is shown in which a wide range feed stock consisting of normal and iso-paraffins having 6 to 11 carbon atoms per molecule is treated. Here, three adsorption zones 186, 188, and 190 are employed having respectively inlet and outlet control valves 192 and 194, 196 and 198, and 200 and 202 all remotely operated by cycle timer operator 204. The same 5 A. adsorbent as above is used. The wide range feed stream is split into a $C_6$ and $C_7$ fraction and $C_8$ through $C_{11}$ fraction in feed splitter still 206. The adsorbent is repeatedly contacted in sequence by the $C_8$ through $C_{11}$ fraction of the feed, then by a recirculated stream of normal octane as the first displacement exchange stream, and then by the $C_6$ and $C_7$ fraction of the feed as second displacement exchange stream. The adsorbent in adsorber 186 is shown being contacted by the $C_6$ and $C_7$ fraction in the third step of the process, the adsorbent in adsorber 188 is being contacted by the feed stream comprising the $C_8$ through $C_{11}$ fraction in the first step, and the adsorbent in adsorber 190 is being contacted by normal octane as the first displacement exchange stream in the second step.

In the first stage of the process, carried out in adsorber 188, the adsorbent saturated with normal $C_6$ and $C_7$ hydrocarbons in the third stage of the preceding cycle of operation is contacted with the feed stream comprising normal and iso $C_8$ through $C_{11}$ hydrocarbons. The normal $C_8$ through $C_{11}$ hydrocarbons displace and are exchanged with the adsorbed normal $C_6$ and $C_7$ hydrocarbons to form an adsorption effluent consisting of the unadsorbed iso $C_8$ through $C_{11}$ hydrocarbons and the displaced normal $C_6$ and $C_7$ hydrocarbons. This effluent is fractionated in still 210 to produce a low anti-knock rating overhead product containing normal $C_6$ and $C_7$ hydrocarbons and a high anti-knock rating bottoms product containing unadsorbed iso $C_8$ through $C_{11}$ hydrocarbons.

The rich adsorbent, now saturated with normal $C_8$ through $C_{11}$ hydrocarbons, is next treated by the first displacement exchange stream essentially comprising normal octane. This is exemplified by the operation of adsorber 190. The normal $C_8$ through $C_{11}$ hydrocarbons are displaced by and exchanged with the normal octane of the first displacement exchange recycle stream to produce a first displacement exchange effluent which is distilled in first extract still 212. The displaced normal $C_8$ through $C_{11}$ hydrocarbons of low anti-knock rating are removed therefrom as a bottoms product and sufficient normal octane is produced therefrom as an overhead product which, in combination with the bottoms product from second extract still 208, produces a sufficient quantity of normal octane for the first displacement exchange stream.

In the third stage of the process the $C_6$ and $C_7$ feed stream passes from the top of feed still 206 through adsorber 186 in the manner shown in the drawing as the second displacement exchange stream. The normal $C_8$ and $C_7$ hydrocarbons are adsorbed displacing and exchanging with the adsorbed normal octane to produce a second displacement exchange effluent containing the unadsorbed iso $C_6$ and $C_7$ hydrocarbons as well as the displaced normal octane. This effluent is distilled in second extract still 208 to produce an overhead product of high anti-knock rating comprising the iso $C_6$ and $C_7$ hydrocarbons, the displaced normal octane is produced as a bottoms product from the still, and the latter is recirculated.

In the production of high anti-knock gasoline the two high anti-knock streams discussed above may be combined if desired. Also if desired, the low anti-knock rating materials may be retreated to produce more desirable materials from this standpoint.

Referring now more particularly to Figure 6, a schematic flow diagram is presented indicating the modifications necessary to adapt an adsorption zone 216 and its associated inlet and outlet control valves 218 and 220 whereby a low pressure or vacuum treating step or adsorbent treatment through contact with a nonadsorbable material, or both, may be incorporated in any of the processes in Figures 1 through 5. As indicated, the fourth port of inlet valve 218 is capped so that when the outlet valve connects adsorption zone 216 to port 4 of that valve and a vacuum is drawn on the adsorbent or the adsorbent pressure is decreased, a low pressure treatment of the rich or partially regenerated adsorbent may be effected as the adsorbent has been contacted by one or more fluids passing therethrough between the similarly numbered ports on the inlet and outlet valves. For example, the feed stream passes into contact with the adsorbent through port 1 on the inlet valve 218 and flows from the adsorbent through port 1 on outlet valve 220. The two displacement exchange streams are similarly passed between the ports numbered 2 and 3 respectively. This provides a four-step cycle of treatment.

In addition to the vacuum or low pressure treatment, it may be desirable in some instances to introduce into contact with the adsorbent a relatively non-adsorbable treating agent during the cycle. Such a material is passed through the adsorber between ports 5 on the inlet and outlet valves. Such an ingredient may comprise toluene or the like which would be effective in removing adsorbed benzene. Such a step is illustrated in the process described above in connection with Figure 3. Obviously the system shown in Figure 6 can be modified so as to provide the low pressure or vacuum treatment or another gas contacting treatment either before or after or between adsorbent contact by the first and second displacement exchange streams. This provides a five-step cycle.

Referring now more particularly to Figure 7 a simplified schematic flow diagram is shown indicating the applicability of the present process to moving or recirculating adsorbent systems. In this modification, adsorption column 230 is provided with a conveyor 232 which removes adsorbent from the bottom of the column and re-introduces it at the top to maintain a downward adsorbent circulation. The adsorbent may be maintained as a downwardly moving bed or as a series of individual fluidized pseudo-liquid suspensions in each of adsorption zones 234, 236, and 238. Using examples similar to those described in connection with Figures 1 through 5, the feed stream is introduced through line 240 to contact the adsorbent in first adsorption zone 234 and the adsorption effluent stream is removed therefrom through line 242 comprising the unadsorbed feed materials as well as the displaced second displacement exchange stream materials. The rich adsorbent is then contacted in second adsorption zone 236 with the less readily adsorbable first displacement exchange stream passing through line 244 thereby producing a partially regenerated adsorbent and a first displacement exchange effluent which is removed through line 246. The adsorbent is finally contacted in third adsorption zone 238 with the still less readily adsorbable second displacement exchange stream introduced through line 248 to produce a second displacement exchange effluent removed through line 250. Moving solid contacting techniques are well known to those skilled in the art and further elaboration of these is unwarranted. It is within the contemplation of this invention to apply any or all of the recirculating solid techniques usually employed in the adsorption and catalytic contacting arts.

Referring now more particularly to Figure 8, a modified form of the process of this invention is shown in which a wide boiling range feed stream is contacted with the 5 A. adsorbent by dividing it into a plurality of relatively narrow fractions in elaboration of the feed splitting step described in connection with Figures 4 and 5. Also incorporated in this modification of the process is the plural stage displacement exchange which has proven highly efficient in restoring the activity of an adsorbent containing a relatively high molecular weight or high boiling range material adsorbed in its pores.

The apparatus employed in the process shown schematically in Figure 8 includes feed splitting columns 260, 262, 264, and 266 by means of which a gasoline stream containing $C_6$ through $C_{10}$ and heavier hydrocarbons is divided into a series of four feed fractions containing respectively the normal and iso $C_6$, $C_7$, $C_8$, and $C_9+$ materials together with other hydrocarbons such as naphthenes and aromatics boiling in these same ranges. Because of the four individual feed streams which are to be processed and because the displacement exchange is effected here in two steps, a total of six individual contacts is employed. Accordingly six adsorption zones 268, 270, 272, 274, 276, and 278 are utilized. As before, each adsorption zone is provided with an inlet control valve and an outlet control valve remotely actuated by cycle timer 280. Each of the six corresponding ports on each of the inlet and outlet control valves are manifolded together by means of the un-numbered lines so connecting these ports and indicated above and below the aligned inlet and outlet valves in Figure 8. As stated above, the fluids are all shown flowing in the same direction in the drawing for simplicity of illustration, but the displacement exchange streams may be passed through in the opposite direction to that of the feed fractions.

The four individual feed streams produced as overhead products from each of the four feed splitting stills are introduced respectively into the first four inlet manifolds, that is those which are connected respectively to ports 1, 2, 3, and 4 of the inlet control valves. The fifth and sixth manifolds are connected respectively to the sources of the first and second displacement exchange streams, hereinafter more fully identified, by means of lines 282 and 284.

Similarly interconnected is a series of six adsorption and displacement exchange effluent stills which receive for separation the six effluents from each of the six adsorption zones. As with the inlet manifolds, the outlet control valves are also manifolded together to direct the effluent from each adsorber during each part of its cycle to the appropriate effluent still. The effluent still all include first adsorption effluent still 286, second adsorption effluent still 288, third adsorption effluent still 290, fourth adsorption effluent still 292, first displacement exchange effluent still 294, and second displacement exchange effluent still 296 connected respectively through the six outlet manifolds which connect respectively the ports numbered 1 through 6 on the outlet control valves.

Cycle timer 280 controls the successive movements of all of the inlet and outlet control valves so that the six adsorption zones are each operating on a different part of the six-step cycle and so that each mass of adsorbent contacts in sequence the four feed streams of successively higher molecular weight and then the two displacement exchange streams of successively lower molecular weight. The cycle is continued in this staggered sequence to effect a continuous processing of the feed stream and a continuous production of the individual components.

With the inlet and outlet control valves in the positions shown the adsorbers indicated from left to right exist in each of the six steps of this process in the order indicated above.

In the first stage, exemplified by adsorption zone 268, adsorbent saturated with normal pentane is being contacted by the first feed stream containing iso and normal hexane to produce a first adsorption effluent consisting of unadsorbed iso-hexane and displaced normal pentane, and leaving a rich adsorbent saturated with normal hexane. The first adsorption effluent is fractionated in still 286 to produce overhead a portion of the second displacement exchange stream, namely normal pentane, and a bottoms fraction is produced consisting of unadsorbed iso-hexane and any other unadsorbable materials in the normal $C_6$ boiling range.

In the second stage of the process, exemplified by adsorber 270, the rich adsorbent saturated with normal hexane is contacted with a second feed containing iso and normal heptane. The iso-heptane remains unadsorbed, the normal heptane displaces and exchanges with the normal hexane leaving an adsorbent saturated with normal heptane, and produces a second adsorption effluent containing iso-heptane and normal hexane. This effluent is distilled in second still 288 to produce overhead normal hexane and to produce as a bottoms fraction iso-heptane.

In the third stage of this process as exemplified by third adsorber 272, the adsorbent saturated with normal heptane is contacted with the third feed fraction containing iso and normal octane. The normal heptane is displaced by the normal octane leaving an adsorbent saturated therewith. A third adsorption effluent is produced containing the displaced normal heptane and the unadsorbed iso-octane. This third effluent is distilled in third still 290 producing normal heptane as an overhead product and iso-octane as a bottoms product.

In the fourth stage of the process exemplified by fourth adsorber 274 the adsorbent saturated with normal octane is contacted with the fourth feed stream containing iso and normal nonane and heavier hydrocarbons. The normal nonane displaces the normal octane producing a fourth adsorption effluent containing it and unadsorbed iso-nonane. This effluent is distilled in fourth still 292 producing normal octane as an overhead product and iso-nonane and heavier as the bottoms product.

The bottoms products from the first four adsorption effluent stills may be combined as shown to form a high anti-knock rating gasoline stream, or they may be kept separate.

In the fifth stage of this process exemplified by adsorption zone 276, the adsorbent saturated with normal nonane and heavier normal paraffins is contacted with the first displacement exchange stream comprising normal heptane which is adsorbed and displaces the adsorbed normal nonane forming a first displacement exchange effluent comprising normal nonane and normal heptane. This effluent is distilled in first displacement exchange effluent still 294 to produce normal heptane as an overhead product and the normal nonane as a bottoms product which may be combined with the normal hydrocarbon fractions produced as overhead products from stills 288, 290, and 282 to form a low anti-knock rating fraction.

In the sixth stage of this process exemplified by sixth adsorber 278, the partially restored adsorbent saturated with normal heptane is contacted with the second displacement exchange stream comprising normal pentane to produce a second exchange effluent comprising normal pentane and displaced normal heptane. This material is distilled in still 296 producing the normal pentane overhead, which is joined with the overhead pentane stream from still 286, to produce the second displacement exchange recycle stream flowing through line 284. The bottoms fraction from still 296 comprises the normal heptane which is combined with the overhead fraction from still 294 to produce the first displacement exchange recycle stream flowing through line 282.

The adsorbent capacity restoration, e.g. the normal nonane and heavier removal in this way, is essentially 100%.

It should be understood however that the normal and iso components so separated from the feed stream can be maintained separate instead of being joined as indicated in Figure 8 to produce a low anti-knock rating and a high anti-knock rating product fraction. Similarly it may be applied to other wide range materials than the ones named. The reverse flow of the displacement exchange streams is obtained by simply reversing the connections into and from each of the inlet and outlet manifolds which connect the ports numbered 5 and 6, e.g. the normal pentane flowing in line 282 is introduced instead into the manifold on outlet ports numbered 6 and the feed for still 296 is taken from the manifold on inlet ports numbered 6, a similar reversal being made for the manifolds on inlet and outlet manifolded ports numbered 5.

The process described above in connection with Figure 8 was applied to the improvement of a highly aromatic gasoline which had been reformed catalytically at about 900° F. and about 400 p.s.i.g. in the presence of hydrogen and a platinum catalyst. The full range material had a boiling range of 104° F. to 400° F. and had an untreated octane rating (F—1+3 ml. TEL) of 97.0. This full range material was distilled into a plurality of six fractions. Each of these fractions was treated in the vapor phase at about atmospheric pressure and 403° F. with a metallo alumino silicate adsorbent having a pore size of 5 A. Prior to contacting the first cut the adsorbent was saturated with normal pentane. Each raffinate was distilled to separate the unadsorbed material of that cut from material displaced from the adsorbent which had been adsorbed from the prior cut. The improvement obtained by the selective adsorption of normal paraffins from each of the fractions is indicated in the accompanying Table II.

TABLE II

*Normal paraffin removal from catalytic reformate fractions*

| Reformate Fraction | Boiling Range, °F. | Portion of Reformate, Volume Percent | n-Paraffin Content, Volume Percent | Raffinate Distillations | | Octane Number, F-1+3 | | Octane Number Increase |
|---|---|---|---|---|---|---|---|---|
| | | | | Cut Point, °F. | Distillation Overhead (Displaced Material), Volume Percent of Cut | Feed Fraction | Distillation Bottoms | |
| n-$C_5$ a | | | 100 | | | | | |
| $C_6$ | 120–174 | 11.85 | 30.4 | 120 | 29.5 | 90.3 | 98.2 | 7.9 |
| $C_7$ | 174–218 | 12.60 | 23.1 | 165 | 25.1 | 83.0 | 90.0 | 7.0 |
| $C_8$ | 218–275 | 24.00 | 11.8 | 210 | 4.6 | 91.6 | 94.5 | 2.9 |
| $C_9$ | 275–320 | 21.15 | 6.2 | 265 | 6.2 | 98.2 | b 100.4 | 2.2 |
| $C_{10}$+ | 320+ | 24.00 | 3.0 | 313 | 3.7 | c 101.9 | d 103.1 | 1.2 | a Adsorbent pre-saturation.
b Iso+0.03 ml. TEL.
c Iso+0.15 ml. TEL.
d Iso+0.26 ml. TEL.

Following contact of the adsorbent with the last or C$_{10}$+ fraction, the rich adsorbent was regenerated using the plural stage displacement exchange steps of this invention in which it was contacted first with two volumes of normal heptane and then with two volumes of normal pentane per volume of normal decane plus paraffins present on the adsorbent. It was determined that the adsorption capacity of the thus regenerated adsorbent for the normal paraffins in the feed fractions was substantially the same as that for fresh adsorbent.

In some complex hydrocarbon streams, the quantity of more readily adsorbable components is not very evenly distributed in the C$_6$, C$_7$, etc. fractions. Often the C$_8$ to C$_{10}$ fractions together contain about an equivalent quantity of normal paraffins as does each of the C$_6$ and C$_7$ fractions. Thus the contact sequence is advantageously changed to C$_6$, then C$_7$, and then the fraction containing the C$_8$, C$_9$, and C$_{10}$ hydrocarbons together.

Referring now more particularly to Figure 9, the modifications necessary to the process shown in Figure 8 are indicated by means of which the displacement exchange recycle streams in Figure 8, comprising relatively pure components separated from the various adsorber effluents, are eliminated and replaced with selected fractions of the feed. For example, in Figure 8 each adsorbent bed is contacted first with a C$_6$ fraction, then C$_7$, then C$_8$, then C$_9$, followed by two contacts with displacement exchange streams consisting of first a C$_7$ fraction and then C$_5$ fraction. In the modification of Figure 9 the body of adsorbent is contacted first with the C$_6$ fraction, then C$_7$, then C$_8$, and then C$_9$ fractions of the feed stream, following which they are then contacted with the C$_8$ fraction and then C$_7$ fraction prior to starting the cycle all over again. A series of six effluent streams of differing composition are still produced and accordingly six raffinate stills are required.

In Figure 9 adsorber 300 is provided with inlet flow control valve 302 and outlet control valve 304 both of which are successively moved through connections with the six numbered ports on the valves. In the inlet manifold however ports 2 and 6 and ports 3 and 5 are connected to the same manifold so that as the valve moves from between successive positions the material introduced in first the C$_6$ fraction, then C$_7$, then C$_8$, then C$_9$, then C$_8$, and C$_7$ again to complete the cycle.

Six individual manifolds are required on the outlet control valve because the six individual raffinates produced comprise respectively iso C$_6$ and normal C$_7$, iso C$_7$ and normal C$_6$, iso C$_8$ and normal C$_7$, iso C$_9$ and normal C$_8$, iso C$_8$ and normal C$_9$, and iso C$_7$ and normal C$_8$ respectively. Each of these are separately distilled as indicated in connection with the process of Figure 8, and the isomeric fractions may be combined or kept separate depending upon the use to which they are put.

The process of this invention thus consists of an improved fractionation process for complex mixtures employing the principles of solid adsorption and distillation combined in such a way so as to remove specific materials from the feed stream by means of the adsorbent and whereby the ordinary heating and gas stripping or liquid washing of the rich adsorbent have been completely eliminated as an ordinary step of the process. The process of this invention may be operated under pressure or under vacuum, and the actual operating pressures are determined by the pressure at which the feed stream is available and its boiling range, and whether the material being contacted is desirably in the vapor phase or the liquid phase. The proper operating pressure can be determined by those skilled in the art from known physical characteristics of the materials to be separated; for example, from the bubble point and dew point of complex hydrocarbon mixtures and the known way in which these change with pressure. The adsorption temperatures employed in the process of this invention are also determined by the physical characteristics of the feed stream and the operating pressure and also whether a vapor phase or a liquid phase contact is desired. In the fractionation of complex gasoline streams the operating temperature is largely determined by the dew point and the bubble point of the stream at a given operating pressure. For example, adsorption temperatures above the dew point will obviously be in the vapor phase while operating temperatures below the bubble point will be in the liquid phase. It is within the contemplation of the present invention to adsorb the feed stream at a temperature between its bubble point and its dew point so that a mixed phase adsorption or displacement exchange desorption will be maintained for some special streams.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The process for treating a plurality of hydrocarbon mixtures having different boiling ranges within the gasoline boiling range, each of said mixtures comprising straight chain and non-straight chain hydrocarbons, which process comprises: (1) contacting the lowest boiling of said mixtures with a solid granular adsorbent consisting essentially of a partially dehydrated zeolitic metallo alumino silicate having substantially uniform intracrystalline pores of about 5 A. in diameter and having adsorbed thereon at least one straight chain hydrocarbon boiling outside the boiling range of said lowest boiling mixture, whereby said adsorbed straight chain hydrocarbon is desorbed and the straight chain components of said lowest boiling mixture are adsorbed, and there is obtained a raffinate product comprising said desorbed straight chain hydrocarbon and the non-straight chain components of said lowest boiling mixture; (2) separating said raffinate product from the adsorbent; (3) repeating said steps (1) and (2) at least once in sequence, the hydrocarbon mixture employed in each repeated contacting step having a boiling range higher than that of the mixture employed in the preceding contacting step; (4) subsequent to the final repetition of said step (2), contacting the adsorbent with a displacement exchange fluid comprising straight chain hydrocarbons of a boiling range lower than that of the straight chain hydrocarbons adsorbed on the adsorbent, whereby the latter are desorbed and said straight chain hydrocarbons of lower boiling range are at least partially adsorbed, and there is obtained an extract product comprising said desorbed straight chain hydrocarbons and any unadsorbed components of said displacement exchange fluid; (5) separating said extract product from the adsorbent; (6) repeating said steps (4) and (5) at least once in sequence; (7) treating said raffinate products to separate the straight chain components therefrom; and (8) treating said extract products to separate the desorbed straight chain hydrocarbon components therefrom.

2. A process according to claim 1 wherein said hydrocarbon mixtures are gasoline fractions obtained by the fractional distillation of a wide boiling range gasoline.

3. A process according to claim 1 wherein, in steps (7) and (8), said separations are effected by fractional distillation.

4. A process as defined by claim 1 wherein, in step (4), said displacement exchange fluid comprises straight chain hydrocarbons separated from said raffinate products.

5. A process as defined by claim 2 wherein, in step (4), said displacement exchange fluid comprises one of said gasoline fractions.

6. A process as defined by claim 2 wherein said distillation is carried out to obtain four fractions comprising $C_6$, $C_7$, $C_8$ and $C_{9+}$ hydrocarbons, respectively; and step (4) is effected twice, employing normal heptane and normal pentane, respectively, as the displacement exchange fluid.

7. A process as defined by claim 2 wherein said distillation is carried out to obtain four fractions comprising $C_6$, $C_7$, $C_8$ and $C_{9+}$ hydrocarbons, respectively; and step (4) is effected twice, employing the said $C_8$ hydrocarbon fraction and the said $C_7$ hydrocarbon fraction, respectively, as the displacement exchange fluid.

8. The process for treating a plurality of hydrocarbon mixtures having different boiling ranges within the gasoline boiling range, each of said mixtures comprising straight chain and non-straight chain hydrocarbons, which process comprises: (1) contacting the lowest boiling of said mixtures with a solid granular adsorbent consisting essentially of a partially dehydrated zeolitic metallo alumino silicate having substantially uniform intra-crystalline pores of about 5 A. in diameter and having adsorbed thereon at least one straight chain hydrocarbon boiling outside the boiling range of said lowest boiling mixture, whereby said adsorbed straight chain hydrocarbon is desorbed and the straight chain components of said lowest boiling mixture are adsorbed, and there is obtained a raffinate product comprising said desorbed straight chain hydrocarbon and the non-straight chain components of said lowest boiling mixture; (2) separating said raffinate product from the adsorbent; (3) repeating said steps (1) and (2) at least once in sequence, the hydrocarbon mixture employed in each repeated contacting step having a boiling range higher than that of the mixture employed in the preceding contacting step; (4) subsequent to the final repetition of said step (2), contacting the adsorbent with a displacement exchange fluid comprising straight chain hydrocarbons of a boiling range lower than that of the straight chain hydrocarbons adsorbed on the adsorbent, whereby the latter are desorbed and said straight chain hydrocarbons of lower boiling range are at least partially adsorbed, and there is obtained an extract product comprising said desorbed straight chain hydrocarbons and any unadsorbed components of said displacement exchange fluid; (5) separating said extract product from the adsorbent; (6) distilling said raffinate product to separate the straight chain components therefrom; and (7) distilling said extract product to separate the said displacement exchange fluid therefrom.

9. A process according to claim 8 wherein the said hydrocarbons are gasoline fractions obtained by the fractional distillation of a wide boiling range gasoline.

10. A process according to claim 9 wherein the said displacement exchange fluid comprises straight chain hydrocarbons separated from said raffinate products.

11. A process according to claim 9 wherein the said displacement exchange fluid comprises one of said gasoline fractions.

12. The process for separating a hydrocarbon mixture boiling in the gasoline boiling range and comprising straight chain and non-straight chain hydrocarbons, which process comprises (1) contacting said mixture with a solid granular adsorbent essentially comprising a partially dehydrated zeolitic metallo alumino silicate having substantially uniform intra-crystalline pores of about 5 A. in diameter and having adsorbed thereon at least one straight chain hydrocarbon boiling outside the boiling range of said mixture, whereby said adsorbed straight chain hydrocarbon is desorbed and the straight chain components of said hydrocarbon mixture are adsorbed, and there is obtained a raffinate product comprising said desorbed straight chain hydrocarbon and non-straight chain components of said hydrocarbon mixture; (2) separating said raffinate product from the adsorbent; (3) contacting the separated adsorbent with a first displacement exchange fluid essentially comprising straight chain hydrocarbons having a boiling range lower than that of the straight chain hydrocarbons adsorbed on the adsorbent, whereby the latter are desorbed and the straight chain hydrocarbons of said first displacement exchange fluid are at least partially adsorbed, and there is obtained a first extract product comprising said desorbed straight chain hydrocarbons and any unadsorbed components of said first displacement exchange fluid; (4) separating said first extract from the adsorbent; (5) contacting the separated adsorbent containing said first displacement exchange fluid with a second displacement exchange fluid essentially comprising straight chain hydrocarbons having a boiling range lower than that of the straight chain hydrocarbons adsorbed on the adsorbent, whereby the latter are desorbed and the straight chain hydrocarbons of said second displacement exchange fluid are at least partially adsorbed, and there is obtained a second extract product comprising said desorbed straight chain hydrocarbons and any unadsorbed components of said second displacement exchange fluid; (6) separating said second extract from the adsorbent; (7) distilling said raffinate product to separate the straight chain components therefrom; and (8) distilling said extract products to separate the said displacement exchange fluid therefrom.

13. A process according to claim 12 wherein the said displacement exchange fluids comprise straight chain hydrocarbons separated from said raffinate product.

References Cited in the file of this patent

UNITED STATES PATENTS

| | | |
|---|---|---|
| 2,306,610 | Barrer | Dec. 29, 1942 |
| 2,425,535 | Hibshman | Aug. 12, 1947 |
| 2,441,572 | Hirschler et al. | May 18, 1948 |
| 2,571,936 | Patterson et al. | Oct. 16, 1951 |
| 2,576,525 | Lipkin | Nov. 27, 1951 |
| 2,582,415 | Claussen | Jan. 15, 1952 |
| 2,693,495 | Hastings et al. | Nov. 2, 1954 |
| 2,776,250 | Capell et al. | Jan. 1, 1957 |
| 2,779,718 | Capell et al. | Jan. 29, 1957 |
| 2,818,455 | Ballard et al. | Dec. 31, 1957 |
| 2,818,449 | Christensen et al. | Dec. 31, 1957 |
| 2,866,835 | Kimberlin et al. | Dec. 30, 1958 |